United States Patent
Chen et al.

(10) Patent No.: US 10,613,695 B2
(45) Date of Patent: Apr. 7, 2020

(54) INTEGRATED TOUCH SENSING AND FORCE SENSING IN A TOUCH DETECTION DEVICE

(71) Applicant: PARADE TECHNOLOGIES, LTD., San Jose, CA (US)

(72) Inventors: Xiaolin Chen, Shanghai (CN); Leilei Chen, Shanghai (CN)

(73) Assignee: PARADE TECHNOLOGIES, LTD., San Jose, CA (US)

( * ) Notice: Subject to any disclaimer, the term of this patent is extended or adjusted under 35 U.S.C. 154(b) by 89 days.

(21) Appl. No.: 16/039,257

(22) Filed: Jul. 18, 2018

(65) Prior Publication Data

US 2018/0364837 A1    Dec. 20, 2018

Related U.S. Application Data

(63) Continuation of application No. PCT/CN2016/071409, filed on Jan. 20, 2016.

(51) Int. Cl.
*G06F 3/044* (2006.01)
*G06F 3/041* (2006.01)
*G06F 3/0488* (2013.01)

(52) U.S. Cl.
CPC ............ *G06F 3/044* (2013.01); *G06F 3/0412* (2013.01); *G06F 3/0414* (2013.01);
(Continued)

(58) Field of Classification Search
CPC ...... G06F 3/044; G06F 3/0488; G06F 3/0416; G06F 3/0414; G06F 3/0412;
(Continued)

(56) References Cited

U.S. PATENT DOCUMENTS 7,532,202 B2    5/2009  Roberts
8,773,146 B1    7/2014  Hills et al.
(Continued)

FOREIGN PATENT DOCUMENTS

CN    101523274 A    9/2009
CN    105068695 A    11/2015
(Continued)

OTHER PUBLICATIONS

Parade Technologies, Ltd., International Search Report and Written Opinion, PCT/CN2016/071409, dated Aug. 29, 2016, 8 pgs.
(Continued)

*Primary Examiner* — Bryan Earles
(74) *Attorney, Agent, or Firm* — Morgan, Lewis & Bockius LLP

(57) ABSTRACT

This application is directed to a touch detection device that has a plurality of sense electrodes, at least one force electrode, and a processing device electrically coupled to the sense electrodes and the force electrode. The sense electrodes are disposed substantially in parallel with the force electrode and separated therefrom by at least an air gap. While operating in a touch sensing state, the processing device leaves the force electrode electrically afloat, measures self-capacitance of each of a subset of sense electrodes, and detects a touch location of an object. While operating in a force sensing state, the processing device drives the force electrode by a transmit signal, measures mutual capacitance of each of a subset of sense electrodes with respect to the force electrode, and detects a touch force on a touch location when an object touches a top surface of the touch detection device.

20 Claims, 7 Drawing Sheets

(52) U.S. Cl.
CPC .......... *G06F 3/0416* (2013.01); *G06F 3/0488* (2013.01); *G06F 2203/04107* (2013.01)

(58) Field of Classification Search
CPC . G06F 2203/04107; G06F 2203/04105; G06F 2203/04104; G09G 3/20; G09G 3/2092; G09G 2300/0426; G09G 2310/08
See application file for complete search history.

(56) References Cited

U.S. PATENT DOCUMENTS

| | | | |
|---|---|---|---|
| 9,164,605 | B1 | 10/2015 | Pirogov et al. |
| 2006/0197753 | A1 | 9/2006 | Hotelling |
| 2008/0136792 | A1 | 6/2008 | Peng et al. |
| 2011/0141053 | A1 | 6/2011 | Bulea et al. |
| 2012/0038583 | A1 | 2/2012 | Westhues et al. |
| 2013/0207938 | A1 | 8/2013 | Ryshtun et al. |
| 2014/0002114 | A1 | 1/2014 | Schwartz et al. |
| 2014/0300559 | A1 | 10/2014 | Tanimoto et al. |
| 2015/0370356 | A1 | 12/2015 | Hwang et al. |
| 2016/0034088 | A1 | 2/2016 | Richards et al. |
| 2016/0239136 | A1 | 8/2016 | Kocak et al. |
| 2017/0200881 | A1 | 7/2017 | Gdala et al. |
| 2017/0235414 | A1 | 8/2017 | Ding et al. |
| 2017/0277350 | A1 | 9/2017 | Wang et al. |
| 2018/0018037 | A1 | 1/2018 | Tan |

FOREIGN PATENT DOCUMENTS

| | | | |
|---|---|---|---|
| CN | 204808295 | U | 11/2015 |
| CN | 204965385 | U | 1/2016 |
| JP | 2014194591 | A | 10/2014 |
| KR | 101565822 | B1 | 11/2015 |

OTHER PUBLICATIONS

Parade Technologies, Ltd., International Search Report and Written Opinion, PCT/CN2017/048693, dated Nov. 7, 2017, 6 pgs.
Parade Technologies, Ltd., International Preliminary Report on Patentability, PCT/CN2017/048693, dated Feb. 26, 2019, 5 pgs.
Drake, Pre-Interview first Office Action, U.S. Appl. No. 15/289,102, dated Mar. 8, 2018, 3 pgs.
Drake, First Action Interview Office Action, U.S. Appl. No. 15/289,102, dated Apr. 20, 2018, 5 pgs.
Drake, Final Office Action, U.S. Appl. No. 15/289,102, dated Sep. 26, 2018, 6 pgs.
Drake, Office Action, U.S. Appl. No. 15/289,102, dated Dec. 13, 2018, 44 pgs.
Drake, Final Office Action, U.S. Appl. No. 15/289,102, dated Jun. 21, 2019, 43 pgs.
Tucker, Pre-Interview Office Action, U.S. Appl. No. 15/289,091, dated Jan. 8, 2018, 4 pgs.
Tucker, Office Action, U.S. Appl. No. 15/289,091, dated Mar. 8, 2018, 7 pgs.
Tucker, Final Office Action, U.S. Appl. No. 15/289,091, dated Aug. 14, 2018, 19 pgs.
Tucker, Final Office Action, U.S. Appl. No. 15/289,091, dated Dec. 31, 2018, 30 pgs.
Qu, Pre-Interview Office Action, U.S. Appl. No. 15/289,098, dated Jan. 23, 2018, 4 pgs.
Qu, Office Action, U.S. Appl. No. 15/289,098, dated Mar. 9, 2018, 6 pgs.
Qu, Notice of Allowance, U.S. Appl. No. 15/289,098, dated Jul. 25, 2018, 8 pgs.
Tucker, Pre-Interview First Office Action, U.S. Appl. No. 15/289,082, dated Feb. 7, 2018, 4 pgs.
Tucker, Final Office Action, U.S. Appl. No. 15/289,082, dated Jul. 9, 2018, 13 pgs.
Tucker, Office Action dated Oct. 2, 2018, U.S. Appl. No. 15/289,082, 40 pgs.
Tucker, Final Office Action dated May 24, 2019, U.S. Appl. No. 15/289,082, 38 pgs.
Tucker, Pre-Interview First Office Action, U.S. Appl. No. 15/289,096, dated Jan. 26, 2018, 4 pgs.
Tucker, Office Action, U.S. Appl. No. 15/289,096, dated Mar. 9, 2018, 7 pgs.
Tucker, Final Office Action, U.S. Appl. No. 15/289,096, dated Aug. 3, 2018, 12 pgs.
Tucker, Office Action, U.S. Appl. No. 15/289,096, dated Nov. 29, 2018, 82 pgs.
Tucker, Final Office Action, U.S. Appl. No. 15/289,096, dated Jun. 10, 2019, 81 pgs.
Sterling, Pre-Interview First Office Action, U.S. Appl. No. 15/289,085, dated Jan. 26, 2018, 4 pgs.
Sterling, Final Office Action, U.S. Appl. No. 15/289,085, dated Aug. 9, 2018, 12 pgs.
Sterling, Office Action, U.S. Appl. No. 15/289,085, dated Dec. 13, 2018, 48 pgs.

INTEGRATED TOUCH SENSING AND FORCE SENSING IN A TOUCH DETECTION DEVICE

RELATED APPLICATION

This application is a continuation of and claims priority to International Application No. PCT/CN2016/071409, filed Jan. 20, 2016, entitled "Integrated Touch Sensing and Force Sensing in a Touch Detection Device," which is incorporated herein by reference in its entirety.

TECHNICAL FIELD

This application relates generally to a touch detection device, including methods and systems for integrating touch detection and force sensing in the touch detection device.

BACKGROUND

Capacitance sensing systems can sense electrical signals generated on electrodes that reflect changes in capacitance. Changes in capacitance can indicate a touch event (e.g., the proximity of an object to particular electrodes). Capacitive sense elements may be used to replace mechanical buttons, knobs, and other similar mechanical user interface controls. The use of a capacitive sense element allows for the elimination of complicated mechanical switches and buttons, providing reliable operation under harsh conditions. In addition, capacitive sense elements are widely used in modern customer applications, providing user interface options in existing products. Capacitive sense elements can range from a single button to a large number arranged in the form of a capacitive sense array for a touch-sensing surface.

Transparent touch screens that utilize capacitive sense arrays are widely applied in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a variation in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. One or more touch locations can be further determined according to the capacitance changes of the capacitive touch sense elements.

On the other hand, touch locations of a non-conductive object cannot be determined as effectively and efficient as those of a conductive object. Moreover, there is a need to measure the magnitude of force associated with a touch by a conductive or non-conductive object.

SUMMARY

Various embodiments of systems, methods, and devices within the scope of the appended claims each have several aspects, no single one of which is solely responsible for the attributes described herein. Without limiting the scope of the appended claims, after considering this disclosure, and particularly after considering the section entitled "Detailed Description," one will understand how the aspects of various embodiments are used to sense both touch and force imposed by a conductive or non-conductive object on a surface of a capacitive sense array in a touch detection device. Generally, this application is directed to a one-layer electrode structure (e.g., an ITO structure) of a touch display that can be used for force sensing and touch sensing via mutual capacitance scanning and self-capacitance scanning, respectively. In some implementations, a force sensing operation is enabled by introduction of an air gap below the ITO structure. In some implementations, a coupling layer is provided for transmission driving when the ITO structure is used for force sensing.

In one aspect, this application discloses a touch detection device including a touch sensing electrode layer having a plurality of sense electrodes, a conductive layer having at least one force electrode, and a processing device electrically coupled to the plurality of sense electrodes and the at least one force electrode. The conductive layer is disposed substantially in parallel with the touch sensing electrode layer and separated from the touch sensing electrode by at least an air gap. The processing device is configured to: (1) in a touch sensing state, while leaving the at least one force electrode electrically afloat, measure self-capacitance of each electrode of a subset of the sense electrodes and detect one or more touch locations if one or more objects touch a top surface of the touch detection device; and (2) in a force sensing state, while driving the at least one force electrode by a transmit signal, measure mutual capacitance at each electrode of a subset of the sense electrodes with respect to the at least one force electrode, and detect a touch force on a touch location if an object touches the top surface of the touch detection device.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

In the following description, for purposes of explanation, numerous specific details are set forth in order to provide a thorough understanding of the present invention. It will be evident, however, to one skilled in the art, that the present invention may be practiced without these specific details. In other instances, well-known circuits, structures, and techniques are not shown in detail, but rather in a block diagram, in order to avoid unnecessarily obscuring an understanding of this description.

Figure 1:
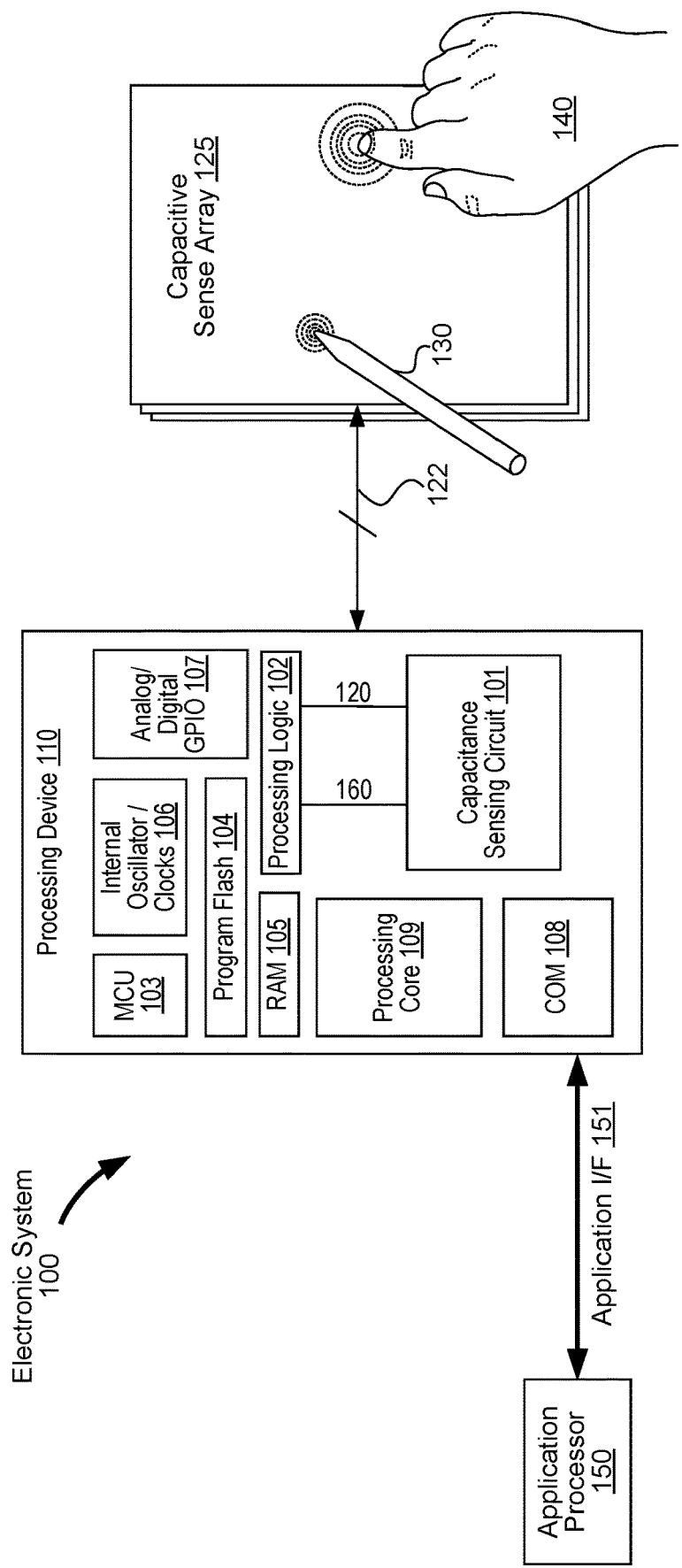
FIG. 1 is a block diagram of an electronic system having a processing device in accordance with some implementations.

FIG. 1 is a block diagram of an electronic system having a processing device in accordance with some implementations. The processing device 110 is configured to detect one or more touches detected proximate to a touch-sensing device, such as a capacitive sense array 125. The processing device 110 can detect conductive objects, such as touch objects 140 (fingers or passive styluses, an active stylus 130, or any combination thereof). The capacitance sensing circuit 101 can measure touch data created by a touch using the capacitive sense array 125. The touch may be detected by a single or multiple sensing cells, each cell representing an isolated sense element or an intersection of sense elements (e.g., electrodes) of the capacitive sense array 125. In some implementations, when the capacitance sensing circuit 101 measures mutual capacitance of the touch-sensing device (e.g., using capacitive sense array 125), the capacitance sensing circuit 101 acquires a 2D capacitive image of the touch-sensing object and processes the data for peaks and positional information. Alternatively, in some implementations, the processing device 110 is a microcontroller that obtains a capacitance touch signal data set from an application processor 150, such as from the capacitive sense array 125, and finger detection firmware executing on the microcontroller identifies data set areas that indicate touches, detects and processes peaks, calculates the coordinates, or any combination therefore. The microcontroller can report the precise coordinates to an application processor.

The electronic system 100 includes a processing device 110, a capacitive sense array 125, a stylus 130, and an application processor 150. The capacitive sense array 125 may include capacitive sense elements that are electrodes of conductive material, such as copper. The sense elements may also be part of an indium-tin-oxide (ITO) panel (sometimes referred to a VCOM). The capacitive sense elements can be used to allow the capacitance sensing circuit 101 to measure self-capacitance, mutual capacitance, or any combination thereof. In the depicted embodiment, the electronic system 100 includes the capacitive sense array 125 coupled to the processing device 110 via a bus 122. The capacitive sense array 125 may include a multi-dimension capacitive sense array. The multi-dimension sense array includes multiple sense elements, organized as rows and columns. Alternatively, in some implementations, the capacitive sense array 125 is a non-transparent capacitive sense array (e.g., PC touchpad). The capacitive sense array 125 may be disposed to have a flat surface profile. Alternatively, the capacitive sense array 125 may have non-flat surface profiles. Alternatively, other configurations of capacitive sense arrays may be used. For example, instead of vertical columns and horizontal rows, the capacitive sense array 125 may have a hexagon arrangement, or the like, as would be appreciated by one of ordinary skill in the art having the benefit of this disclosure. In some implementations, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configurable to detect the presence of a touch object 140, the presence of a stylus 130 on the capacitive sense array 125, or any combination thereof. In some implementations, an active stylus 130 is configured to operate as the timing "master," and the processing device 110 adjusts the timing of the capacitive sense array 125 to match that of the active stylus 130 when the active stylus 130 is in use. In some implementations, the capacitive sense array 125 capacitively couples with the active stylus 130, as opposed to conventional inductive stylus applications. It should also be noted that the same assembly used for the capacitive sense array 125, which is configured to detect touch objects 140, is also used to detect and track a stylus 130 without an additional PCB layer for inductively tracking the active stylus 130.

In the depicted embodiment, the processing device 110 includes analog and/or digital general purpose input/output ("GPIO") ports 107. The GPIO ports 107 may be programmable. The GPIO ports 107 may be coupled to a Programmable Interconnect and Logic ("PIL"), which acts as an interconnect between the GPIO ports 107 and a digital block array of the processing device 110 (not shown). The digital block array may be configured to implement a variety of digital logic circuits (e.g., DACs, digital filters, or digital control systems). In some implementations, the digital logic circuits are configurable user modules ("UMs"). The digital block array may be coupled to a system bus. The processing device 110 may also include memory, such as random access memory ("RAM") 105 and program flash 104. The RAM 105 may be static RAM ("SRAM"), and the program flash 104 may be a non-volatile storage, which may be used to store firmware (e.g., control algorithms executable by the processing core 109 to implement operations described herein). The processing device 110 may also include a memory controller unit ("MCU") 103 coupled to the memory and the processing core 109. The processing core 109 is a processing element configured to execute instructions or perform operations. The processing device 110 may include other processing elements as would be appreciated by one of ordinary skill in the art having the benefit of this disclosure. It should also be noted that the memory may be internal to the processing device or external to it. When the memory is internal, the memory may be coupled to a processing element, such as the processing core 109. When the memory is external to the processing device, the processing device is coupled to the other device in which the memory resides, as would be appreciated by one of ordinary skill in the art having the benefit of this disclosure.

In some implementations, the processing device 110 further includes processing logic 102. Some or all of the operations of the processing logic 102 may be implemented in firmware, hardware, software, or some combination thereof. The processing logic 102 may receive signals from the capacitance sensing circuit 101, and determine the state of the capacitive sense array 125, such as whether an object (e.g., a finger) is detected on or in proximity to the capacitive sense array 125 (e.g., determining the presence of the object), resolve where the object is on the sense array (e.g., determining the location of the object), tracking the motion of the object, or other information related to an object detected at the touch sensor. Alternatively, in some implementations, the processing logic 102 may include the capacitance sensing circuit 101. Alternatively, in some implementations, the processing logic 102 performs some or all of the functions of the capacitance sensing circuit 101 and/or the functions of the processing device 110.

In some implementations, the processing logic 102 generates a multi-touch enable signal 120 and a touch force enable signal 160 to control the capacitance sensing circuit 101 to detect touch locations and measure force associated with a touch location, respectively. The multi-touch enable signal 120 enables a touch sensing state in which a force electrode of the capacitive sense array 125 is decoupled from any electrical source (e.g., the ground) and self-capacitance of each electrode of a subset of sense electrodes is scanned, such that one or more touch locations are detected if one or more objects touch a top surface of the touch detection device 100. The touch force enable signal 160 enables a force sensing state in which the at least one force electrode of the capacitive sense array 125 is driven by a transmit signal and mutual capacitance of each electrode of a subset of the sense electrodes with respect to the at least one force electrode is scanned, such that a touch force on a touch location could be detected if an object touches the top surface of the touch detection device.

In some implementations, the processing core 109 generates the multi-touch enable signal 120 and the touch force enable signal 160 to control the capacitance sensing circuit 101 to detect touch locations and measure force associated with a touch location, respectively.

The processing device 110 may also include an analog block array (not shown) (e.g., field-programmable analog array). The analog block array is also coupled to the system bus. The analog block array may also be configured to implement a variety of analog circuits (e.g., ADCs or analog filters) using, configurable UMs. The analog block array may also be coupled to the GPIO 107.

As illustrated, the capacitance sensing circuit 101 may be integrated into processing device 110. The capacitance sensing circuit 101 may include analog I/O for coupling to an external component, such as a touch-sensor pad (not shown), a capacitive sense array 125, a touch-sensor slider (not shown), touch-sensor buttons (not shown), and/or other devices. The capacitance sensing circuit 101 may be configured to measure capacitance using mutual-capacitance sensing techniques, self-capacitance sensing techniques, charge-coupling techniques, charge balancing techniques, or the like. In some implementations, the capacitance sensing circuit 101 operates using a charge accumulation circuit, a capacitance modulation circuit, or other capacitance sensing methods known by those skilled in the art. In some implementations, the capacitance sensing circuit 101 is one of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g., an LCD monitor), or a transparent substrate in front of the display. In some implementations, the TX and RX electrodes are configured in rows and columns, respectively. It should be noted that the rows and columns of electrodes can be configured as TX or RX electrodes by the capacitance sensing circuit 101 in any chosen combination. In some implementations, the TX and RX electrodes of the sense array 125 are configured to operate as TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of an RX electrode and a TX electrode (a sense element) as done during mutual-capacitance sensing. An intersection between two sense elements may be understood as a location at which one sense electrode crosses over or overlaps another, while maintaining galvanic isolation from each other. The capacitance associated with the intersection between a TX electrode and an RX electrode can be sensed by selecting every available combination of a TX electrode and an RX electrode. When a touch object, such as a finger or stylus, approaches the capacitive sense array 125, the object causes a decrease in mutual capacitance between some of the TX/RX electrodes. Alternatively, in some implementations, the presence of a finger increases the capacitance of the electrodes to the environment (Earth) ground, typically referred to as self-capacitance change. Utilizing the change in mutual capacitance, the location of the finger on the capacitive sense array 125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more touch objects can be determined. It should be noted that the process can calibrate the sense elements (intersections of RX and TX electrodes) by determining baselines for the sense elements. It should also be noted that interpolation may be used to detect finger position at better resolutions than the row/column pitch, as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

The passive integrator circuit may be an off-chip discrete component, an on-chip component, part of the capacitive sense array 125, or any combination of the these.

The processing device 110 may include internal oscillator/clocks 106 and a communication block ("COM") 108. Alternatively, in some implementations, the processing device 110 includes a spread-spectrum clock (not shown). The oscillator/clocks block 106 provides clock signals to one or more of the components of processing device 110. The communication block 108 may be used to communicate with an external component, such as an application processor 150, via application interface ("I/F") line 151.

The processing device 110 may reside on a common carrier substrate such as, for example, an integrated circuit ("IC") die substrate, a multi-chip module substrate, or the like. Alternatively, the components of the processing device 110 may be one or more separate integrated circuits and/or discrete components. For example, the processing device 110 may be a Programmable System on a Chip (PSoC®) processing device. Alternatively, the processing device 110 may be one or more other processing devices known by those of ordinary skill in the art, such as a microprocessor or central processing unit, a controller, a special-purpose processor, a digital signal processor ("DSP"), an application specific integrated circuit ("ASIC"), a field programmable gate array ("FPGA"), or the like.

It should also be noted that the embodiments described herein are not limited to having a configuration of a processing device coupled to an application processor, but may include a system that measures the capacitance on the sensing device and sends the raw data to a host computer where it is analyzed by an application. In effect, the processing that is done by processing device 110 may also be done in the application processor.

The capacitance sensing circuit 101 may be integrated into the IC of the processing device 110 or into a separate IC. Alternatively, the descriptions of capacitance sensing circuit 101 may be generated and compiled for incorporation into other integrated circuits. For example, behavioral level code describing the capacitance sensing circuit 101, or portions thereof, may be generated using a hardware descriptive language, such as VHDL or Verilog, and stored on a machine-accessible medium (e.g., a CD-ROM, a hard disk, or a floppy disk). Furthermore, the behavioral level code can be compiled into register transfer level ("RTL") code, a netlist, or a circuit layout, and stored to a machine-accessible medium. The behavioral level code, the RTL code, the netlist, and the circuit layout may represent various levels of abstraction to describe the capacitance sensing circuit 101.

It should be noted that the components of the electronic system 100 may include all the components described above. Alternatively, the electronic system 100 may include some of the components described above.

In some implementations, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, a global position system ("GPS"), or a control panel. The embodiments described herein are not limited to touch screens or touch-sensor pads for notebook implementations, but can be used in other capacitive sensing implementations. For example, the sensing device may be a touch-sensor slider (not shown) or touch-sensor buttons (e.g., capacitance sensing buttons). In some implementations, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including, but not limited to, pick buttons, sliders (e.g., to adjust display brightness and contrast), scroll-wheels, multi-media controls (e.g., to control volume or track advance), handwriting recognition, and numeric keypad operation.

Figure 2:
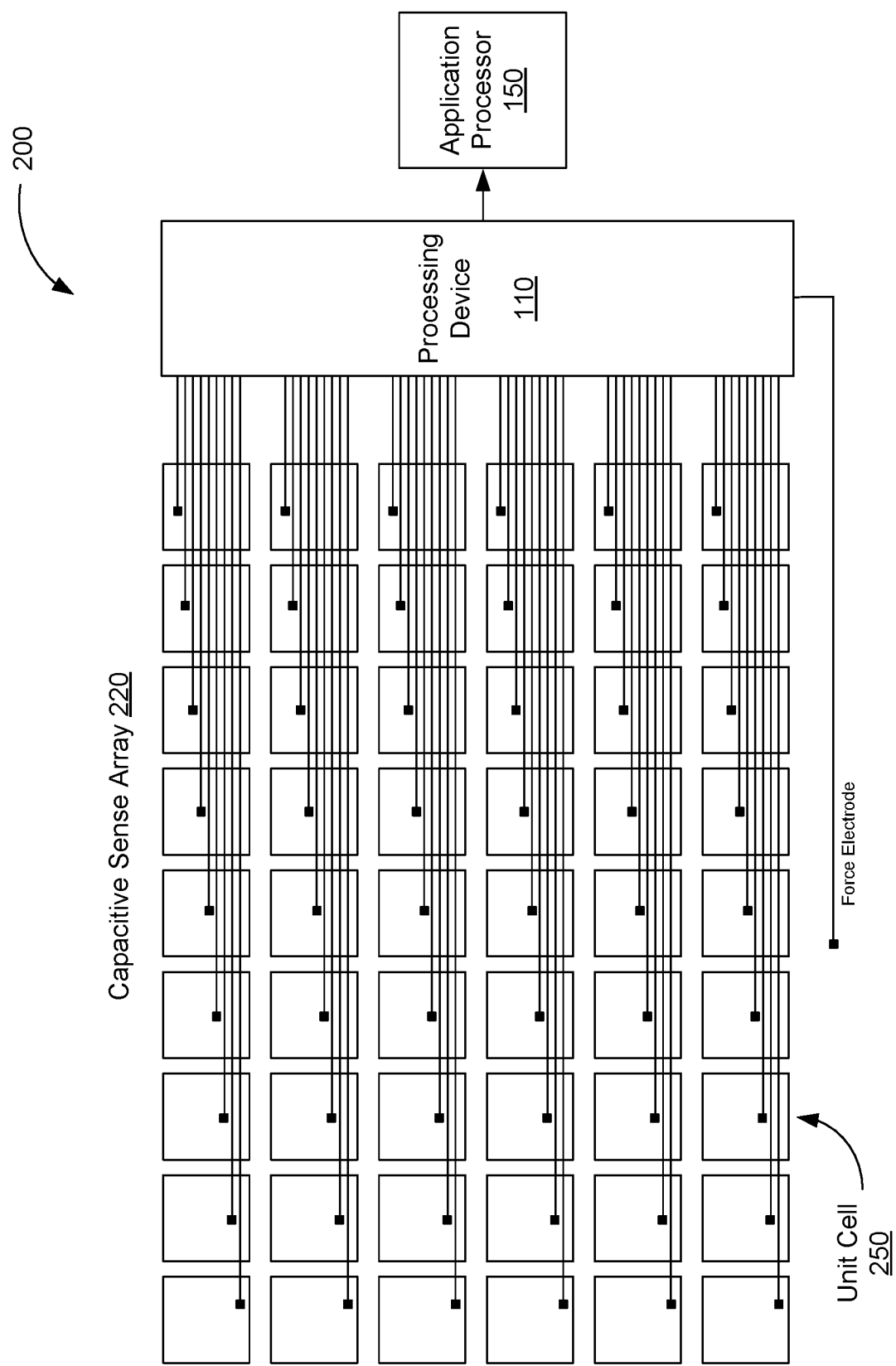
FIG. 2 illustrates a capacitive-sense touch-sensing system in accordance with some implementations.

FIG. 2 illustrates a capacitive-sense touch-sensing system 200 in accordance with some implementations. The capacitive touch-sensing system 200 includes a sense array 220. The sense array 220 may be a capacitive-sense array. In some implementations, the sense array 220 includes multiple row electrodes and multiple column electrodes. The row and column electrodes are connected to a processing device 110, which may include the functionality of capacitance sensing circuit 101, as illustrated in FIG. 1. In some implementations, the sense array 220 includes a plurality of unit cells 250 that are individually addressed by a plurality of electrodes (as shown in FIG. 2). In some implementations, the processing device 110 performs self-capacitance measurement scans of the sense array 220 to measure a self-capacitance value associated with each electrode in the sense array 220. The measured capacitances may be further processed to determine touch locations (which is optionally represented by centroid locations of one or more contacts) of conductive objects proximate to the sense array 220.

In some implementations, the processing device 110 is connected to an application processor 150, which may receive the measured capacitances or calculated centroid locations from the processing device 110.

In some implementations not shown in FIG. 2, the sense array 220 includes electrodes arranged to create a pattern of interconnected diamond shapes. Specifically, the electrodes of the sense array 220 form a single solid diamond (SSD) pattern. In some implementations, each electrode defines a unit cell.

In some implementations, the capacitive touch-sensing system 200 collects data from the entire touch-sensing surface of sense array 220 by performing a scan to measure capacitances of the unit cells that comprise the touch-sensing surface, then processes the touch data serially or in parallel with a subsequent scan. For example, one system that processes touch data serially may collect raw capacitance data from each unit cell of the entire touch-sensing surface, and filter the raw data. Based on the filtered raw data, the system may determine local maxima (corresponding to local maximum changes in capacitance) to calculate positions of fingers or other conductive objects, then perform post processing of the resolved positions to report locations of the conductive objects, or to perform other functions such as motion tracking or gesture recognition.

In some implementations, the capacitive touch-sensing system 200 is configured to perform self-capacitance sensing. In some implementations, the capacitive touch-sensing system 200 is configured to perform self-capacitance sensing, in sequence or in parallel, to measure the self-capacitance of each electrode of the touch-sensing surface (e.g., sense array 220), such that the total number of sense operations is N×M, for a capacitive-sense array having N rows and M columns. In some implementations, the capacitive touch sensing system 200 is capable of connecting individual electrodes together to be sensed in parallel with a single operation. For example, multiple electrodes may be coupled together and sensed in a single operation to determine whether a conductive object is touching or near the touch-sensing surface.

In some implementations, multiple capacitance-sensing circuits may be used in parallel to measure a signal coupled to multiple column electrodes simultaneously, from a signal applied to one or more row electrodes. In some implementations, for a capacitive-sense array (e.g., the sense array 220) having X rows, Y columns, and N columns that can be sensed simultaneously, the number of mutual capacitance sensing operations is the smallest whole number greater than or equal to $$\frac{X \cdot Y}{N}.$$

In some implementations, each update of the touch locations includes a sensing portion and a non-sensing portion. The sensing portion may include measurement of capacitance associated with intersections between electrodes, while the non-sensing portion may include calculation of touch locations based on the capacitance measurements and reporting of the calculated touch locations to a host device.

In addition, the capacitive touch-sensing system 200 may include an integrator circuit (not shown).

In some implementations, the capacitive sense array 220 further includes a force electrode that is disposed under the sense electrodes and separated from the sense electrodes by at least an air gap. The force electrode is electrically coupled to the processing device. In a touch sensing state, the processing device 110 leaves the at least one force electrode electrically afloat (i.e., decouple the force electrode from the ground or any other current or voltage source). In a force sensing state, the processing device 110 drives the force electrode by a transmit signal.

Figure 3:
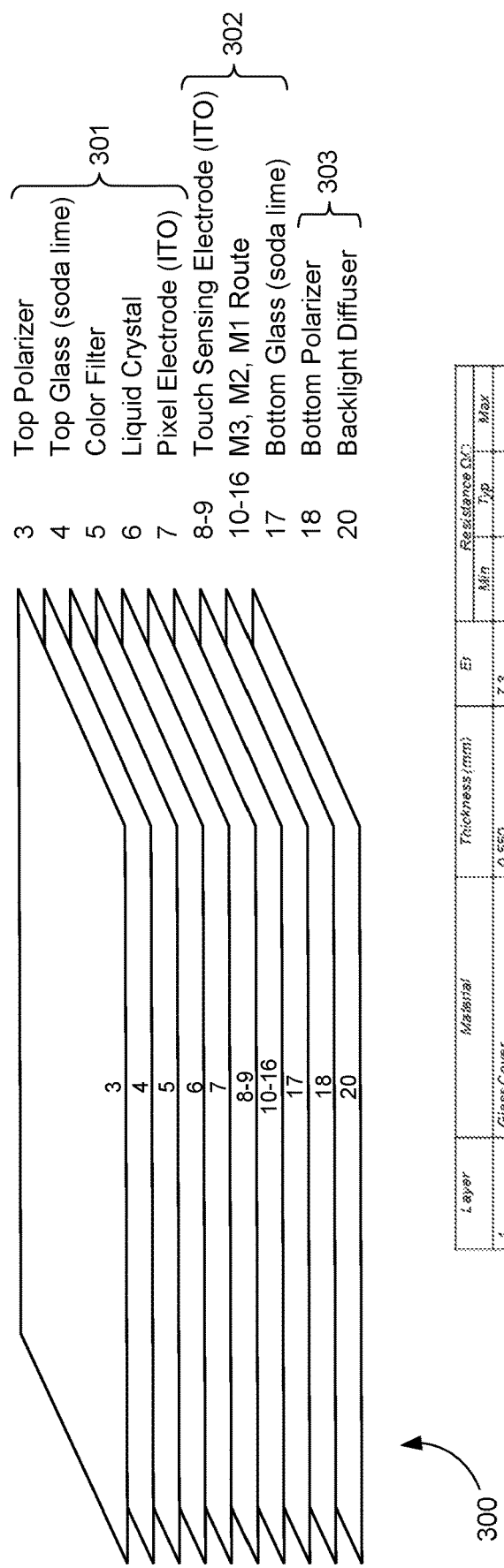
FIG. 3 is a perspective view of a touch detection device having a plurality of structural layers in accordance with some implementations.

FIG. 3 is a perspective view of a touch detection device 300 including a plurality of structural layers in accordance with some implementations. The touch detection device 300 integrates touch sensing functions with a liquid crystal display (LCD), forming an LCD stack 302, a touch sensing stack 302, and a backlight stack 303. The LCD stack 302 includes one or more of a top polarizer panel, a top glass panel, a color filter layer, a LCD panel, and at least one pixel electrode layer. The at least one pixel electrode layer is made of a transparent and electrically conductive material (e.g., indium tin oxide). The pixel electrode layer is patterned to include a plurality of display electrodes, each configured to drive at least one display pixel of the LCD panel (i.e., polarizing LCD molecules in the display pixel differently to pass or block incoming light). The backlight stack 303 includes one or more of a backlight diffuser and a bottom polarizer, and modulates the incoming light from the side or the back of touch detection device 300 before the incoming right reaches the LCD stack 302. The LCD stack 302 and the backlight stack 303 together provide conventional displaying functions that are available in most LCD display devices.

The touch sensing stack 302 is disposed between the LCD stack and the backlight stack 303. The touch sensing stack 302 includes a bottom glass layer, a routing layer, and a touch sensing electrode layer that is transparent and electrically conductive. In a specific example, the touch sensing electrode layer is made of ITO. In some implementations, the bottom glass layer is a substrate on which the routing layer and the touch sensing electrode layer are formed. The touch sensing electrode layer is deposited and photo-lithographically defined to an array of sense electrodes forming a single solid diamond (SSD) pattern as shown in FIG. 2. The routing layer includes one or more layers of conductive material, and each conductive material layer is patterned to interconnects. The interconnects of the routing layer provide access to the sense electrodes in the touch sensing electrode layer, and forms a capacitive sense array 125 or 220 as shown in FIGS. 1 and 2 with the array of sense electrodes. As explained above with reference to FIGS. 1 and 2, the capacitive sense array 125 is electrically coupled to a processing device 110 that is configured to implement self-capacitance sensing and mutual capacitance sensing by providing drive signals to the sense electrodes and processing signals received therefrom.

The table in FIG. 3 provides an example list of materials that are used to form a touch sense display 300. Some geometrical, optical, and electrical properties of the materials are also listed in the table of FIG. 3.

Figure 4:
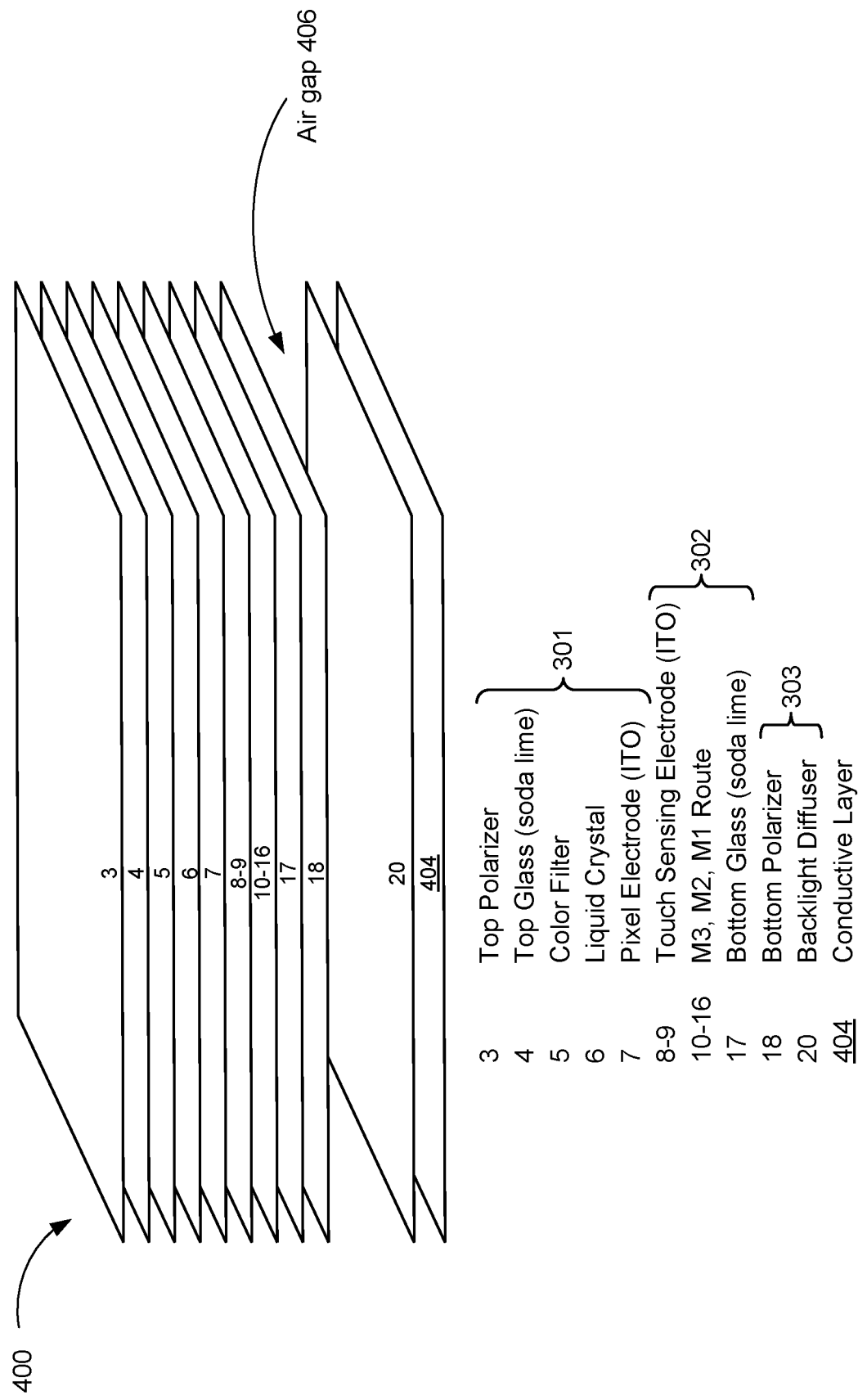
FIG. 4 is a perspective view of another touch detection device having a plurality of structural layers and an air gap, in accordance with some implementations.

FIG. 4 is a perspective view of another touch detection device 400 including a plurality of structural layers and an air gap in accordance with some implementations. The touch detection device 400 integrates touch sensing functions with a liquid crystal display (LCD). The touch detection device 400 is also configured to enable quantitative measurement of touch force associated with a touch event caused by a conductive or non-conductive object. On the other hand, the touch detection device 400 is still configured to detect one or more touch locations of conductive or non-conductive objects that touch the top surface of the capacitive sense array.

Like the touch detection device 300, the touch detection device 400 includes a LCD stack 301, a touch sensing stack 302, and a backlight stack 303. The LCD stack 301 includes one or more of a top polarizer panel, a top glass panel, a color filter layer, an LCD panel, and at least one pixel electrode layer. The backlight stack 303 includes one or more of a backlight diffuser and a bottom polarizer. The LCD stack 301 and the backlight stack 303 together provide conventional displaying functions that are available in most LCD display devices. The touch sensing stack 302 is disposed between the LCD stack 301 and the backlight stack 303. The touch sensing stack 302 may include a bottom glass layer, a routing layer and a touch sensing electrode layer (e.g., ITO VCOM). Interconnects formed on the routing layer provide access to sense electrodes in the touch sensing electrode layer, and forms a capacitive sense array 125 or 220 as shown in FIGS. 1 and 2 with the array of sense electrodes. As explained above, the capacitive sense array 125 or 220 is electrically coupled to a processing device 110, which is configured to provide drive signals to the sense electrodes and to process signals received therefrom. One or more touches from a conductive object can be detected simultaneously or sequentially via self-capacitance sensing and mutual capacitance sensing of the sense electrodes of the capacitive sense array 125.

The touch detection device 400 includes a conductive layer 404 (e.g., a metal layer) in addition to the LCD stack 301, the touch sensing stack 302, and the backlight stack 303. Optionally, the conductive layer 404 is a metal layer. Optionally, the conductive layer 404 is transparent and electrically conductive. The conductive layer 404 is optionally disposed on top of the bottom polarizer (i.e., between the bottom glass and the bottom polarizer), between the bottom polarizer and the backlight diffuser, or under the backlight diffuser. In a specific example, the conductive layer 404 is made of ITO, and coated on a third glass layer. The third glass layer coated with the conductive layer 404 is then disposed under the backlight diffuser, and incoming light optionally enters the backlight diffuser from its side or passes the conductive layer 404 to reach the backlight diffuser. In another example, the conductive layer 404 is coated on a surface of the backlight diffuser.

Further, the conductive layer 404 is separated from the touch sensing electrode by at least an air gap 406 having a predetermined thickness. The air gap 406 is optionally arranged between the bottom glass and the bottom polarizer, the bottom polarizer and the backlight diffuser, or the backlight diffuser and the conductive layer 404. For example, the conductive layer 404 is coated on a third glass layer. The third glass layer is disposed between the bottom polarizer and the backlight diffuser, and separated from the bottom polarizer by an air gap when the bottom polarizer is mechanically coupled to the bottom glass. Alternatively, as shown in FIG. 4, the third glass layer is disposed under the backlight diffuser, and the backlight diffuser is separated from the bottom polarizer by an air gap when the bottom polarizer is mechanically coupled to the bottom glass. In some implementations, the predetermined thickness of the air gap is within a range of 0.1-3 mm. The height of the air gap 406 changes as force is applied to the touch sensing stack 302 (causing deflection of the stack 302), which is reflected in corresponding changes in mutual capacitance measured at electrodes with locations near the x-y position of the applied force.

The conductive layer 404 includes at least one force electrode. Optionally, the conductive layer 404 includes an array of force electrodes.

As shown in FIG. 2, in some implementations, the processing device 110 is electrically coupled to both the plurality of sense electrodes of the touch sensing electrode layer and the at least one force electrode of the conductive layer 404. The processing device is configured to operate in a touch sensing state (see FIG. 5) and in a force sensing state (see FIG. 6). In the touch sensing state, the processing device 110 is configured to leave the at least one force electrode electrically afloat, measure self-capacitance of each electrode of a subset of the sense electrodes and detect one or more touch locations if one or more objects touch a top surface of the touch detection device 400. In the force sensing state, the processing device 110 is configured to drive the at least one force electrode of the conductive layer 404 by a transmit signal, measure mutual capacitance of each electrode of a subset of the sense electrodes with respect to the at least one force electrode, and detect a touch force on a touch location if an object touches the top surface of the touch detection device.

In some implementations, the LCD stack 301 and the touch sensing stack 302 and the bottom polarizer are integrated in a LCD module. The air gap is arranged between the backlight diffuser and the bottom polarizer. The conductive layer 404 is either disposed above or below the backlight diffuser, and does not significantly impact the integrated LCD module. In particular, it only introduces a limited cost when the conductive layer 404 is disposed under the backlight diffuser.

In some implementations, the at least one force electrode of the conductive layer 404 includes two or more force electrodes, and are coupled to two or more electrical pins that could provide one or more transmit signals to drive the two or more force electrodes.

Figure 5:
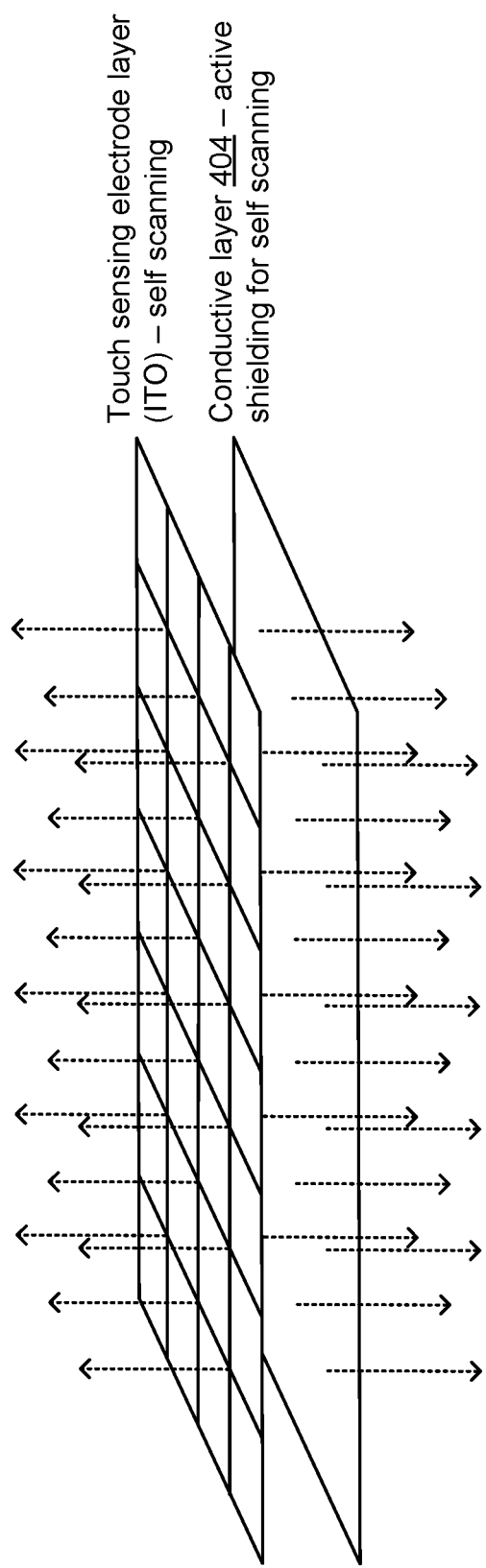
FIG. 5 is a structural diagram of a touch sensing electrode layer and a conductive layer that are configured to operate in a touch sensing state in accordance with some implementations.

FIG. 5 is a structural diagram of a touch sensing electrode layer and a conductive layer that are configured to operate in a touch sensing state in accordance with some implementations. The touch sensing electrode layer includes a plurality of sense electrodes, and is disposed closer to the top surface of a touch detection device (e.g., the touch detection device 300 or 400) than the conductive layer. The conductive layer includes at least one force electrode, and the conductive layer is disposed substantially in parallel with the touch sensing electrode layer and separated from the touch sensing electrode by at least an air gap. The processing device 110 selects a subset of the sense electrodes, and scans the subset of the sense electrodes to measure self-capacitance of each of the subset of the sense electrodes. Specifically, the processing device 110 measures a respective capacitance between each of the subset of the sense electrodes and the ground of the touch detection device. As a result of self-capacitance scanning, the processing device 110 can identify more than one touch location on the top surface of the touch detection device simultaneously or sequentially.

In the touch sensing state, the at least one force electrode of the conductive layer is left electrically afloat. The processing device 110 is configured to decouple the at least one force electrode of the conductive layer from the ground and any voltage or current source available in the touch detection device. The conductive layer protects the sense electrodes of the touch sensing electrode layer from undesirable noise sources, and provides active shielding for measurement of the self-capacitance of the selected sense electrodes.

Figure 6:
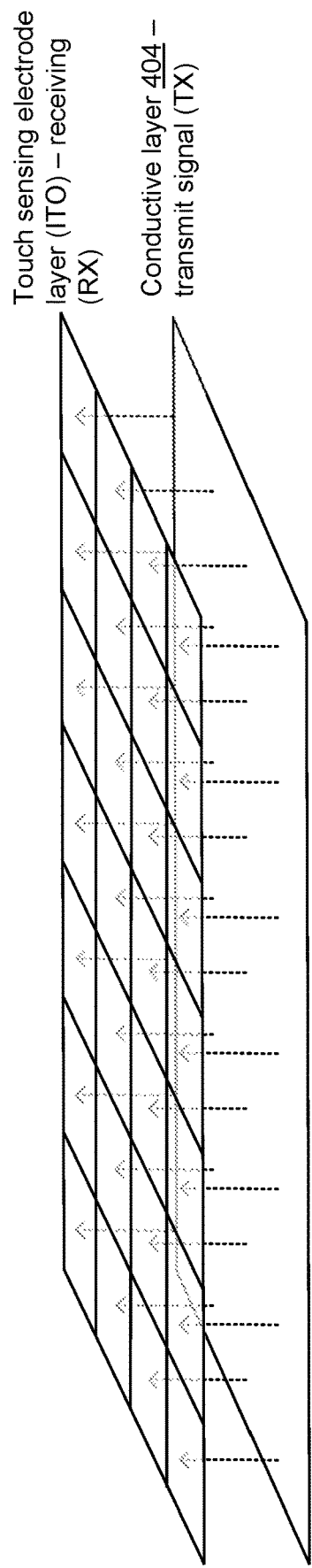
FIG. 6 is a structural diagram of a touch sensing electrode layer and a conductive layer that are configured to operate in a force sensing state in accordance with some implementations.

FIG. 6 is a structural diagram of a touch sensing electrode layer and a conductive layer that are configured to operate in a force sensing state in accordance with some implementations. The force sensing state is enabled for the same touch detection device that is configured to operate in the touch sensing state as explained with respect to FIG. 5. In the force sense state, the processing device 110 drives the at least one force electrode of the conductive layer 404 by a transmit signal. The transmit signal is optionally a DC voltage signal (e.g., the ground) or a pulsed signal. The processing device 100 further selects a subset of the sense electrodes, and scans the subset of the sense electrodes to measure mutual capacitance between the at least one force electrode and each of the subset of the sense electrodes. The processing device 110 and the application processor 150 are configured to determine one or more touch locations and the corresponding touch forces based on the mutual capacitances measured between the at least one force electrode and each of the selected sense electrodes.

In some implementations, the gap thickness of the entire air gap varies in response to a touch on the top surface of the touch detection device. The stacks above the air gap could tilt, and therefore, a side of the air gap is pressed down with a smaller gap thickness while another side of the air gap is slightly lifted up with a larger gap. Alternatively, the entire stacks above the air gap could be pressed down, with the gap thickness reduced differently at different locations of the touch detection device. Due to the gap thickness variation, the mutual capacitances between the at least one force electrode and each of the selected sense electrodes are different but related. The processing device 110 and the application processor 150 are configured to determine one or more touch locations and the corresponding touch forces based on the mutual capacitances measured between the at least one force electrode and each of the selected sense electrodes. In some implementations, the touch detection device is calibrated under different touch locations and touch forces, and the processing device 110 and the application processor 150 are configured to detect the touch forces based on the calibrations.

Because the force sensing state relies on the variation of the air gap thickness, it can be used to detect touch locations of non-conductive objects that touch the top surface of the capacitive sense array. A conventional touch detection device 300 cannot operate in the force sensing state, and only detects touch locations associated with conductive objects. In some implementations, as neighboring sense electrodes adjacent to touch locations are also associated with air gap variation and mutual capacitance variations, the touch positions of the conductive or non-conductive objects, if measured in the force sensing state, are not as accurate as those measured at the touch sensing state for the conductive objects. Nevertheless, the force sensing state allows the touch detection device 400 to obtain quantitative measurement of touch force associated a touch event caused by a conductive or non-conductive object, which is not feasible in a touch detection device 300.

In some implementations, the touch detection device includes a touch sensing mode (also called as a self-scanning mode) and a force sensing mode (also called as a mutual scanning mode) for enabling the touch sensing state and the force sensing state, respectively.

Further, in some implementations, in a mutual capacitance state, while leaving the at least one force electrode electrically afloat, the processing device 110 is configured to measure a plurality of mutual capacitances, each between two of the plurality of sense electrodes. This detects one or more touch locations if one or more objects touch the top surface of the touch detection device. Likewise, in some implementations, the touch detection device includes a mutual capacitance mode for enabling the mutual capacitance state.

Figure 7:
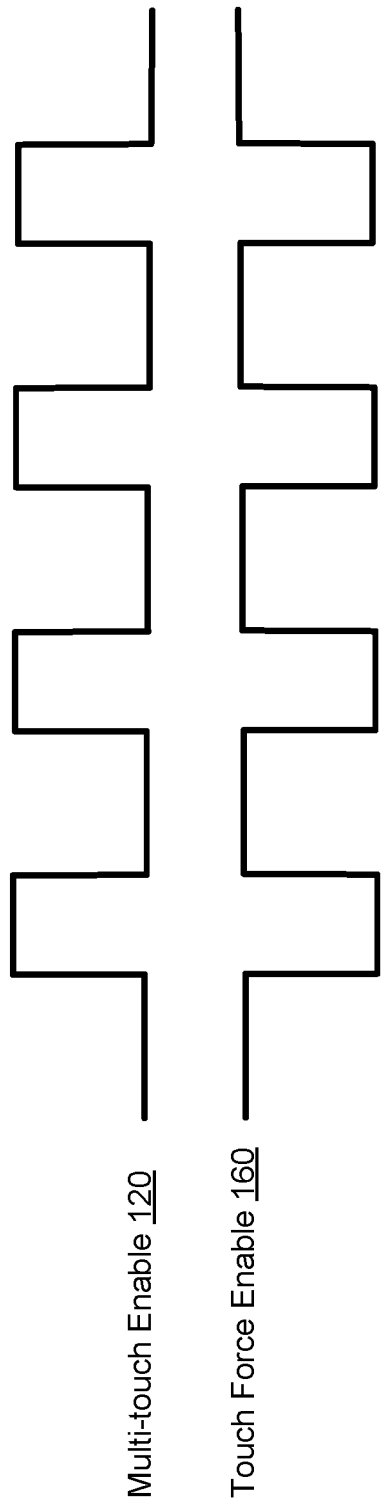
FIG. 7 provides timing diagrams of two example control signals (e.g., a state machine in FW) used to enable a touch sensing state and a force sensing state alternatingly in accordance with some implementations.

FIG. 7 provides timing diagrams of two example control signals used to enable a touch sensing state and a force sensing state alternatingly (i.e., in an alternating manner) in accordance with some implementations. The control signals include a multi-touch enable signal 120 and a touch force enable signal 160, each having a respective duty cycle. In some implementations, the multi-touch enable signal 120 and the touch force enable signal 160 are substantially complementary, and the sum of their duty cycles is substantially equal to 1. Alternatively, in some implementations, the sum of the two duty cycles is less than 1. The multi-touch enable signal 120 and the touch force enable signal 160 are used to enable the touch sensing state and the force sensing state alternatingly (e.g., at two distinct time slots) on the capacitive sense array and the processing device 110 according to their respective duty cycles.

In some implementations, the multi-touch enable signal 120 and the touch force enable signal 160 are generated by a state machine implemented in the processing logic 102.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

In the detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, mechanical structures, circuits, and networks have not been described in detail so as not to unnecessarily obscure aspects of the implementations.

It will also be understood that, although the terms first and second are, in some instances, used herein to describe various elements, these elements should not be limited by these terms. These terms are only used to distinguish one element from another. For example, a first layer can be termed a second layer, and, similarly, a second layer can be termed a first layer, without departing from the scope of the various described implementations. The first layer and the second layer are both layers, but they are not the same layer.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, components, structures and/or groups, but do not preclude the presence or addition of one or more other features, steps, operations, elements, components, structures, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

What is claimed is:

1. A touch detection device, comprising:
    a touch sensing electrode layer including a plurality of sense electrodes;
    a conductive layer including at least one force electrode, the conductive layer being disposed substantially in parallel with the touch sensing electrode layer and separated from the touch sensing electrode layer by at least an air gap; and
    a processing device electrically coupled to the plurality of sense electrodes and the at least one force electrode, wherein the processing device is configured to:
        in a touch sensing state, while leaving the at least one force electrode electrically afloat, measure self-capacitance of each electrode of a subset of the sense electrodes and detect one or more touch locations when one or more objects touch a top surface of the touch detection device; and
        in a force sensing state, while driving the at least one force electrode by a transmit signal, measure mutual capacitance of each electrode of a subset of the sense electrodes with respect to the at least one force electrode, and detect a touch force on a touch location when an object touches the top surface of the touch detection device.

2. The touch detection device of claim 1, wherein the processing device is configured to generate one or more control signals to enable the touch sensing state and the force sensing state alternatingly.

3. The touch detection device of claim 2, wherein duty cycles for the touch sensing state and the force sensing state are substantially complementary.

4. The touch detection device of claim 2, wherein the processing device includes a state machine configured to generate the one or more control signals for controlling duty cycles of the touch sensing state and the force sensing state.

5. The touch detection device of claim 1, wherein the touch detection device includes a touch sensing mode and a force sensing mode for enabling the touch sensing state and the force sensing state, respectively.

6. The touch detection device of claim 1, wherein the touch detection device is configured to:
    in a mutual capacitance state, while leaving the at least one force electrode electrically afloat, measure a plurality of mutual capacitances, each between two of the plurality of sense electrodes, and detect one or more touch locations when one or more objects touch the top surface of the touch detection device.

7. The touch detection device of claim 1, further comprising:
    at least one of a backlight diffuser and a polarizer, disposed between the touch sensing electrode layer and the conductive layer.

8. The touch detection device of claim 1, further comprising:
    a liquid crystal display (LCD) stack disposed between the touch sensing electrode layer and the top surface of the touch detection device, wherein the LCD stack is configured to enable a LCD-based display.

9. The touch detection device of claim 1, wherein the touch sensing electrode layer is made of a transparent and electrically conductive material.

10. A method of detecting touch events, comprising:
at a touch detection device having a touch sensing electrode layer including a plurality of sense electrodes, a conductive layer including at least one force electrode and a processing device electrically coupled to the plurality of sense electrodes and the at least one force electrode, the conductive layer being disposed substantially in parallel with the touch sensing electrode layer and separated from the touch sensing electrode layer by at least an air gap:
in accordance with a touch sensing state, leaving the at least one force electrode electrically afloat, and measuring self-capacitance of each electrode of a subset of the sense electrodes and detecting one or more touch locations when one or more objects touch a top surface of the touch detection device; and
in accordance with a force sensing state:
driving the at least one force electrode by a transmit signal;
measuring mutual capacitance of each electrode of a subset of the sense electrodes with respect to the at least one force electrode; and
detecting a touch force on a touch location when an object touches the top surface of the touch detection device.

11. The method of claim 10, wherein the processing device is configured to generate one or more control signals to enable the touch sensing state and the force sensing state alternatingly, and wherein duty cycles of the touch sensing state and the force sensing state are substantially complementary.

12. The method of claim 10, wherein the transmit signal is a DC voltage signal or a pulsed signal.

13. The method of claim 10, further comprising:
identifying a non-conductive object; and
determining the touch location detected in the force sensing state as the touch location of the non-conductive object.

14. The method of claim 10, further comprising:
identifying one or more conductive objects; and
determining the one or more touch locations detected in the touch sensing state as the one or more touch locations of the one or more conductive objects.

15. A touch detection device, comprising:
a plurality of sense electrodes;
at least one force electrode disposed substantially in parallel with the plurality of sense electrodes and separated from the plurality of sense electrodes by at least an air gap; and
a processing device electrically coupled to the plurality of sense electrodes and the at least one force electrode, wherein the processing device is configured to:
in a touch sensing state, while leaving the at least one force electrode electrically afloat, measure self-capacitance of each electrode of a subset of the sense electrodes and detect one or more touch locations when one or more objects touch a top surface of the touch detection device; and
in a force sensing state, while driving the at least one force electrode by a transmit signal, measure mutual capacitance of each electrode of a subset of the sense electrodes with respect to the at least one force electrode, and detect a touch force on a touch location when an object touches the top surface of the touch detection device.

16. The touch detection device of claim 1, wherein the conductive layer is substantially transparent and electrically conductive.

17. The touch detection device of claim 15, wherein the processing device is configured to detect the touch force based on calibration data that is captured and stored during calibration when reference touches are applied at a plurality of predetermined touch locations on the top surface of the touch detection device and with a plurality of predetermined touch forces.

18. The touch detection device of claim 1, wherein in the touch sensing state, the processing device is configured to electrically decouple the at least one force electrode of the conductive layer from a ground and any voltage or current source available in the touch detection device.

19. The touch detection device of claim 15, wherein in the force sensing state, the touch detection device is configured to detect a touch location of a non-conductive object touch based on the mutual capacitance measured between the at least one force electrode and an associated subset of the sense electrodes.

20. The touch detection device of claim 15, wherein the processing device is configured to scan the self-capacitance of each electrode of the subset of the sense electrodes in the touch sensing state, and scan the mutual capacitance of each electrode of the subset of the sense electrodes with respect to the at least one force electrode in the force sensing state.

* * * * *